Dec. 24, 1929.　　　　C. SAUER　　　　1,740,876
SUPPORTING AND CLAMPING DEVICE
Filed Feb. 14, 1928
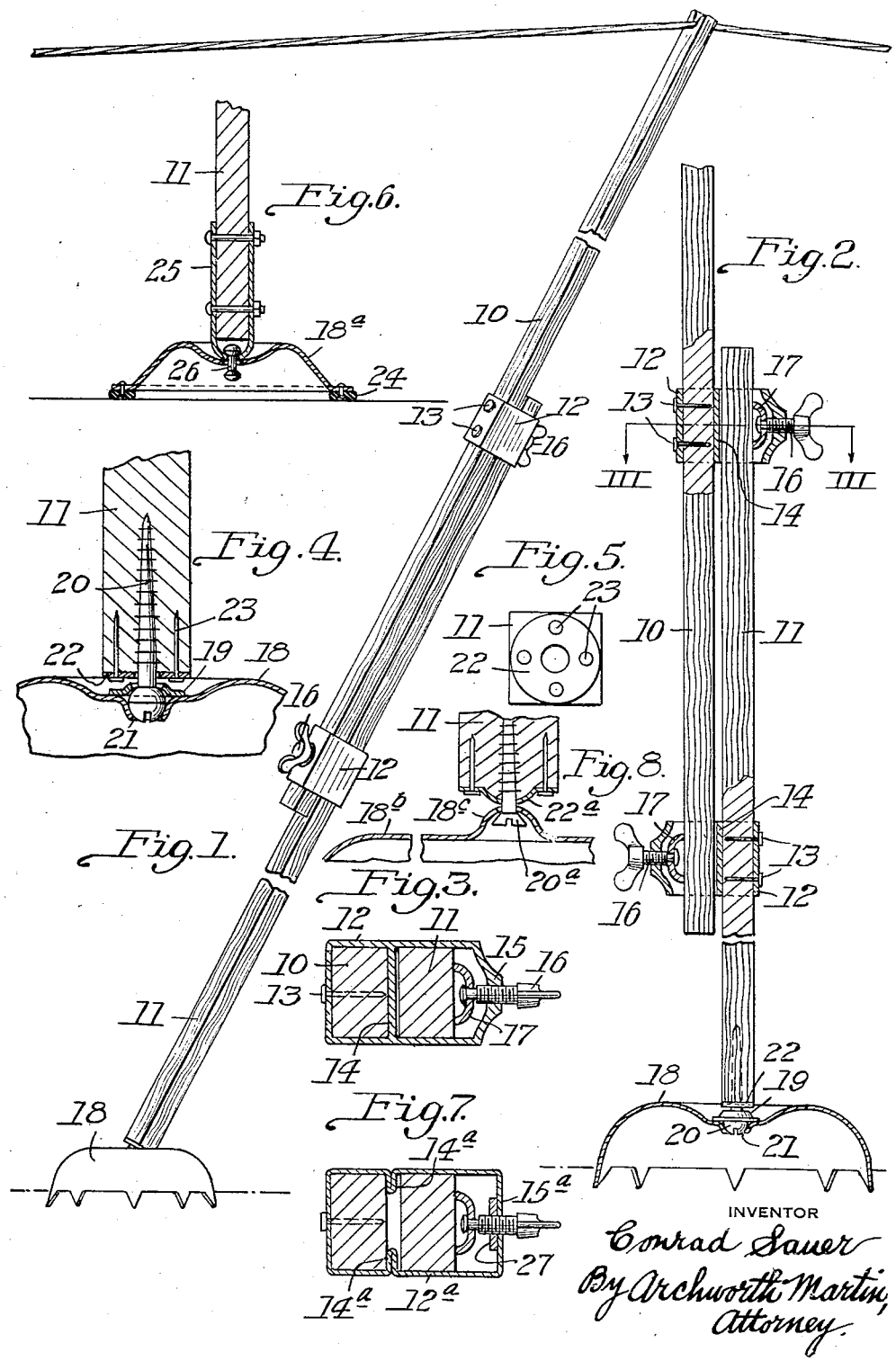
INVENTOR
Conrad Sauer
By Archworth Martin,
Attorney Patented Dec. 24, 1929

1,740,876

UNITED STATES PATENT OFFICE

CONRAD SAUER, OF PITTSBURGH, PENNSYLVANIA, ASSIGNOR OF FIFTY PER CENT TO JOHN G. DOELFEL, OF PITTSBURGH, PENNSYLVANIA

SUPPORTING AND CLAMPING DEVICE

Application filed February 14, 1928. Serial No. 254,184.

My invention relates to supporting and clamping devices for clotheslines props, etc., although it is susceptible of use in various other relations.

One object of my invention is to provide an improved form of supporting base for a prop or the like.

Another object of my invention is to provide improved means for adjustably connecting a plurality of pole sections.

Still another object of my invention is to simplify and improve generally the structure of clothesline props and the like.

Some of the various forms which my invention may take are shown in the accompanying drawing, wherein Figure 1 is a perspective view of a prop embodying my invention; Fig. 2 is a vertical sectional view of the structure of Fig. 1, but with the prop in vertical position; Fig. 3 is a view taken on the line III—III of Fig. 2; Fig. 4 is a view, on an enlarged scale, of a portion of the apparatus of Fig. 2; Fig. 5 is a bottom plan view of the lower pole section of Fig. 2; Fig. 6 is a view showing a modification of a portion of the structure of Fig. 2; Fig. 7 is a view showing a modification of the yokes or ferrules of the other figures, and Fig. 8 is a further modification of the device of Fig. 2.

Referring now to the structure of Figs. 1 to 5, I show a prop composed of pole sections 10 and 11, each of which carries a yoke or ferrule 12 secured thereto by nails 13. Each ferrule or yoke is provided with a partition plate 14 at opposite sides of which the pole sections 10 and 11 are respectively disposed. These partition plates 14 serve to more firmly hold the yokes and poles in assembled relation and permits the poles to slide more readily when effecting adjustments.

Each yoke has its outer wall 15 thickened to permit the formation of threads therein for co-operation with thumb screws 16. The inner end of each thumb screw 16 has a reduced portion in which an anchoring plate or clamp 17 engages, the clamping plate having a central perforation, to permit more ready assembling of the plate and the screw. The metal surrounding the slotted portions of the clamping plate can be deflected slightly through insertion of the screw and then, if necessary, bent back so that they will engage the reduced or neck portion of the screw. The clamping plate 17 is of cup shape form and the inner surface of the yoke wall 15 is correspondingly curved, instead of being rectangular, as is the opposite wall so that there is an economy in size and quantity of material required for the yokes. It will be seen that when the thumb nuts 16 are bolted to clamp the pole sections, such sections will be firmly supported against longitudinal movement. The anchoring plates 17 are loosely supported by the thumb screws so that they will have slight universal movement, to permit them to accommodate themselves to irregularities in contacting surfaces of the pole sections and so that the entire peripheral edges of the plates will bear upon the pole which it clamps.

An anchoring plate or footing 18, preferably of metal and of inverted cup shape is provided for supporting the pole structure. As shown in Figs. 1 and 2, the plate is provided with teeth that will bite into the ground and prevent slipping of the pole, when the pole is in inclined position, as is usually the case. The central portion of the footing 18 is depressed and is covered by a plate 19 which is welded or riveted thereto, thus forming a socket for confining the head of a screw 20. An opening 21 is provided in the central portion of the footing 18 to permit the insertion of a screw driver for turning the screw into the pole section 11, thus effecting connection between the pole structure and the footing, which connection is universal, by reason of the ball and socket relation of the screw 20 to the footing. If desired, the teeth could be omitted from the footing 18 and the footing supported directly by its edge.

In order to reinforce the lower end of the pole section 11 and reduce its tendency to split through insertion of the screw 20, I secure a metal plate or washer 22 thereto by nails 23.

In Fig. 6, I show a footing 18ᵃ that is a modification of the footing 18, but which instead of having teeth at its lower edge is flanged so that a rubber pad 24 may be riveted thereto. This pad will permit the use of the pole on porch floors, without danger of marring the floors and will nevertheless reduce tendency of the pole to slip. The pad could further be employed where the pole rests upon cement, and where teeth such as those on the footing 18 would not bite into the supporting surface.

Another point of distinction between the structures of Figs. 2 and 6, resides in the fact that in Fig. 6 I provide a sheet metal yoke or socket 25 for the lower end of the pole section, the lower end of the socket embracing one head of a rivet 26, the other head of the rivet being disposed interiorly of the footing $18^a$ and held against displacement with respect to the footing by the opening in the footing through which the body portion of the rivet extends. In this case as in the structure of Fig. 2, the pole will have universal movement about its base.

In Fig. 7, I show a modified form of yoke or clamping strap $12^a$ that may be made of sheet metal, since the inwardly directed portions $14^a$ thereof serve as a dividing wall and can be readily stamped to form. The outer wall $15^a$ may be thickened by welding a plate thereto so that there will be sufficient screw-threaded engagement between the thumb screw 16 and the ferrule $12^a$.

In Fig. 8 there is shown a further modification in which the base $18^b$ is formed with a rounded boss $18^c$, which is adapted to receive the head of a screw $20^a$. The pole 11 is capped with a dished plate $22^a$ into which the pole seats, and which forms a pivotal bearing with the boss of the base $18^b$.

I claim as my invention:—

A footing for poles and the like comprising a member of inverted cup-shape form having a perforated depression in its upper side, a plate bridging said depression and secured to the said member and an attaching member having a head portion disposed within the space between said bridging plate and the central portion of the cup-shaped member, and resting upon said member, the shank of the attaching member extending loosely through an opening in said plate to permit of universal movement thereof with respect to the footing plate, and the head of the attaching member being accessible through said perforation.

In testimony whereof I, the said CONRAD SAUER, have hereunto set my hand.

CONRAD SAUER.